US012586462B2

(12) United States Patent
Huang et al.

(10) Patent No.: US 12,586,462 B2
(45) Date of Patent: Mar. 24, 2026

(54) SYSTEM AND METHOD FOR GENERATING TRAFFIC CONGESTION DATA FOR AN IMPACTED ROAD

(71) Applicant: HERE Global B.V., Eindhoven (NL)

(72) Inventors: Weimin Huang, Chicago, IL (US); Jingwei Xu, Buffalo Grove, IL (US); Bruce Bernhardt, Wauconda, IL (US); Yuxin Guan, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 381 days.

(21) Appl. No.: 18/077,081

(22) Filed: Dec. 7, 2022

(65) Prior Publication Data

US 2024/0194059 A1 Jun. 13, 2024

(51) Int. Cl.
*G08G 1/01* (2006.01)
*G08G 1/052* (2006.01)

(52) U.S. Cl.
CPC ......... *G08G 1/0133* (2013.01); *G08G 1/0108* (2013.01); *G08G 1/0129* (2013.01); *G08G 1/0141* (2013.01); *G08G 1/0145* (2013.01); *G08G 1/052* (2013.01)

(58) Field of Classification Search
CPC .. G08G 1/0133; G08G 1/0108; G08G 1/0129; G08G 1/0141; G08G 1/0145; G08G 1/052; G08G 1/096725; G08G 1/096741; G08G 1/096775; G08G 1/0112
See application file for complete search history.

(56) References Cited

U.S. PATENT DOCUMENTS

| | | | |
|---|---|---|---|
| 8,620,568 | B2 | 12/2013 | Shirahatti et al. |
| 9,047,495 | B2 | 6/2015 | Miller et al. |
| 9,437,107 | B2 | 9/2016 | Scofield et al. |
| 2008/0319639 | A1 | 12/2008 | Yamane |

(Continued)

OTHER PUBLICATIONS

Pan et al., "Forecasting Spatiotemporal Impact of Traffic Incidents on Road Networks", 2013 IEEE International Conference on Data Mining (ICDM), Dec. 2013, 10 pages.

(Continued)

*Primary Examiner* — Yuen Wong
(74) *Attorney, Agent, or Firm* — DITTHAVONG, STEINER & MLOTKOWSKI

(57) ABSTRACT

A system, a method, and a computer program product may be provided for generating traffic congestion data for a road in a region. The system may include a memory configured to store computer executable instructions and a processor configured to execute the computer executable instructions to obtain probe data and map data. The processor may be further configured to generate traffic condition data for the road. The processor may be further configured to determine speed changes data associated with one or more vehicles. The processor may be further configured to calculate congestion length, time period, congestion speed for the one or more vehicles to reach a non-congestion state from a congestion state. The processor may be further configured to generate the traffic congestion data, based on the speed changes data, congestion length, a time period and congestion speed associated with the one or more vehicles on the road.

19 Claims, 6 Drawing Sheets

(56) References Cited

U.S. PATENT DOCUMENTS

| | | | | |
|---|---|---|---|---|
| 2015/0206427 | A1 | 7/2015 | Blandin et al. | |
| 2017/0352262 | A1* | 12/2017 | Xu ........................ | G08G 1/0133 |

OTHER PUBLICATIONS

Kartika, "Visual Exploration of Spatial-temporal Traffic Congestion Patterns Using Floating Car Data", 2015, 72 pages.
Mangharam et al., "Real-time Traffic Congestion Prediction", Nov. 2008, 5 pages.

* cited by examiner

SYSTEM AND METHOD FOR GENERATING TRAFFIC CONGESTION DATA FOR AN IMPACTED ROAD

TECHNOLOGICAL FIELD

The present disclosure generally relates to traffic and navigation systems, and more particularly relates to generating traffic congestion data for a road in a region.

BACKGROUND

Traffic conditions play a critical role in autonomous driving. Traffic congestion, one of the traffic conditions, often means stopped or stop-and-go traffic, where vehicle speeds are slower and sometimes much slower as compared to normal or free flow speeds. A traffic congestion jam may occur and start accumulating as a result of traffic volume exceeding an available road capacity. The traffic congestion may be caused by various reasons, such as, but not limited to, bad weather like heavy snow or fog, an accident and sports events in a nearby region. The traffic congestion may hamper vehicles, for example by prolonging travel time, by increasing a likelihood of collisions, or by forcing drivers or autonomous vehicles onto unfamiliar or undesirable travel routes. Consequently, dangerous queuing situations may result in bottlenecks or hazardous situations like significant crashes.

Existing congestion prediction systems rely on roadside sensors to measure traffic data related to the traffic congestion. However, such sensors are usually spaced at least half miles apart and don't provide information granular enough to produce accurate traffic data related to the traffic congestion. Additionally, from economic perspective, the roadside sensors may unlikely provide full road network coverage. Consequently, actual speed changes for the traffic congestion may not be analyzed. Accordingly, there is a need for a reliable system to analyze traffic data related to the traffic congestion accurately.

BRIEF SUMMARY

A system, a method, and a computer program product are provided herein that focuses on generating traffic congestion data. In one aspect, the system for generating the traffic congestion data for a road in a region may be provided. The system may include at least one non-transitory memory configured to store computer program code; and at least one processor (hereinafter referred as processor) configured to execute the computer program code to obtain probe data and map data for a region. In accordance with an embodiment, the processor may be configured to generate traffic condition data for the region, based on the probe data and the map data, wherein the traffic condition data comprises congestion state indication data or non-congestion state indication data. In accordance with an embodiment, the processor may be configured to determine speed changes data associated with one or more vehicles based on the traffic condition data. In accordance with an embodiment, the processor may be configured to generate the traffic congestion data based on the speed changes data associated with the one or more vehicles in the region.

According to some example embodiments, the processor may be further configured to calculate a time period for the one or more vehicles to reach a non-congestion state from a congestion state, based on the congestion state indication data and the non-congestion state indication data for generation of the traffic congestion data.

According to some example embodiments, the processor may be further configured to calculate a congestion length for the one or more vehicles to reach the non-congestion state from the congestion state, based on the congestion state indication data and the non-congestion state indication data for generation of the traffic congestion data.

According to some example embodiments, the processor may be further configured to calculate a congestion speed for the calculated congestion length and the calculated time period.

According to some example embodiments, the processor may be further configured to determine a classification of the congestion state into at least one of a recurring congestion state and a non-recurring congestion state.

According to some example embodiments, the processor may be further configured to determine the classification of the congestion state into the recurring congestion, based on at least historical traffic pattern data of the probe data.

According to some example embodiments, the processor may be further configured to determine the classification of the congestion state into the non-recurring congestion, based on at least incident data of the probe data.

According to some example embodiments, the processor may be configured to obtain the map data of the region and update the map data of the region based on the traffic congestion data.

According to some example embodiments, the processor may be configured to transmit a congestion warning message to one or more end user vehicles, based on the updated map data.

According to some example embodiments, the processor is further configured to recommend driving strategies to one or more end user vehicles, based on the updated map data.

Embodiments disclosed herein may provide a method for determining traffic congestion data for a road in a region. The method may include obtaining, by one or more processors, probe data and map data for a region; determining, by the one or more processors, traffic condition data, based on the probe data and the map data, wherein the traffic condition data comprises congestion state data or non-congestion state data; determining, by the one or more processors, speed changes data associated with one or more vehicles, based on the traffic condition data; determining, by the one or more processors, temporal data and spatial data associated with the one or more vehicles to reach a congestion state to a non-congestion state, based on the traffic condition data; and generating, by the one or more processors, the traffic congestion data based on the determined speed changes data, the temporal data and the spatial data.

Embodiments of the present disclosure may provide a computer programmable product including at least one non-transitory computer-readable storage medium having computer-executable program code stored therein. The computer programmable product comprising a non-transitory computer readable medium having stored thereon computer executable instructions, which when executed by a computer, cause the computer to carry out operations, for determining traffic congestion data for a road in a region, the operations comprising obtaining, by one or more processors, probe data and map data for a region; determining, by the one or more processors, traffic condition data, based on the probe data and the map data. The traffic condition data comprises congestion state data or non-congestion state data; determining, by the one or more processors, speed changes data associated with one or more vehicles, based on the traffic condition data; determining, by the one or more processors, temporal data and spatial data associated with the one or more vehicles to reach a congestion state to a non-congestion state, based on the traffic condition data; and generating, by the one or more processors, the traffic congestion data based on the determined speed changes data, the temporal data and the spatial data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
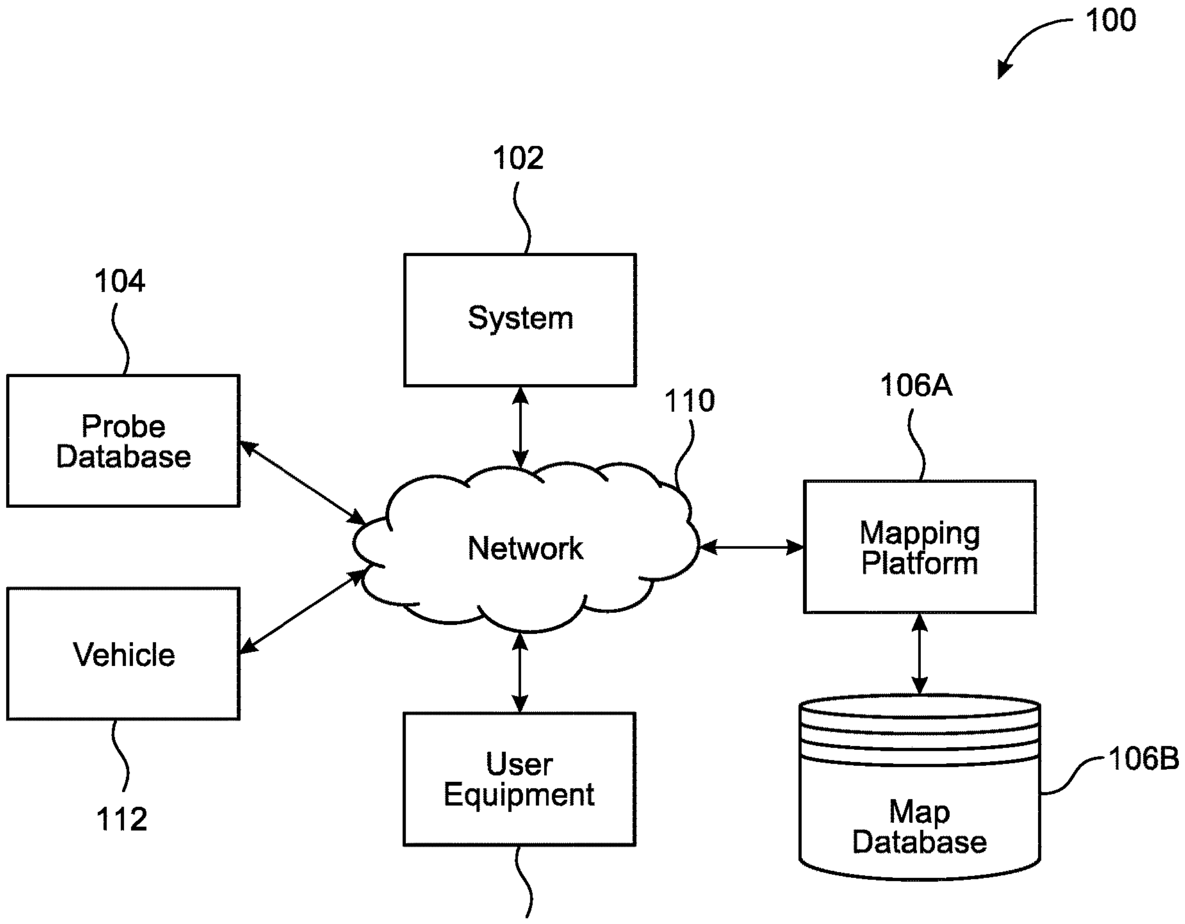
Figure 2:
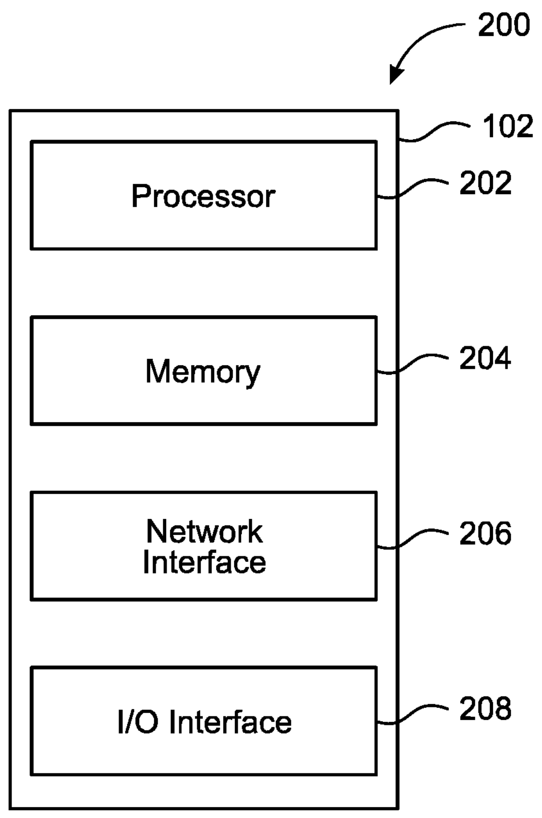
Figure 3:
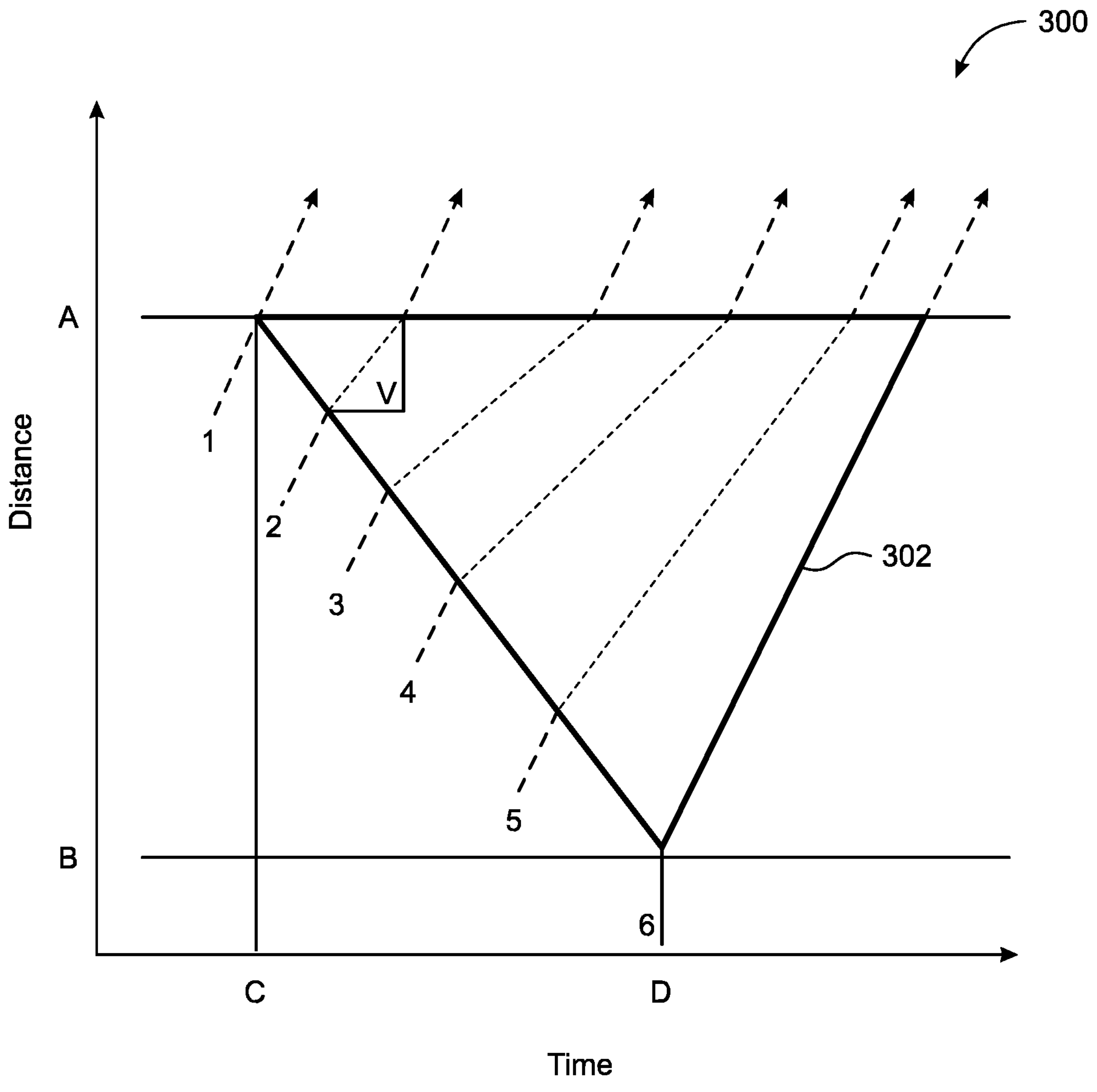
Figure 4:
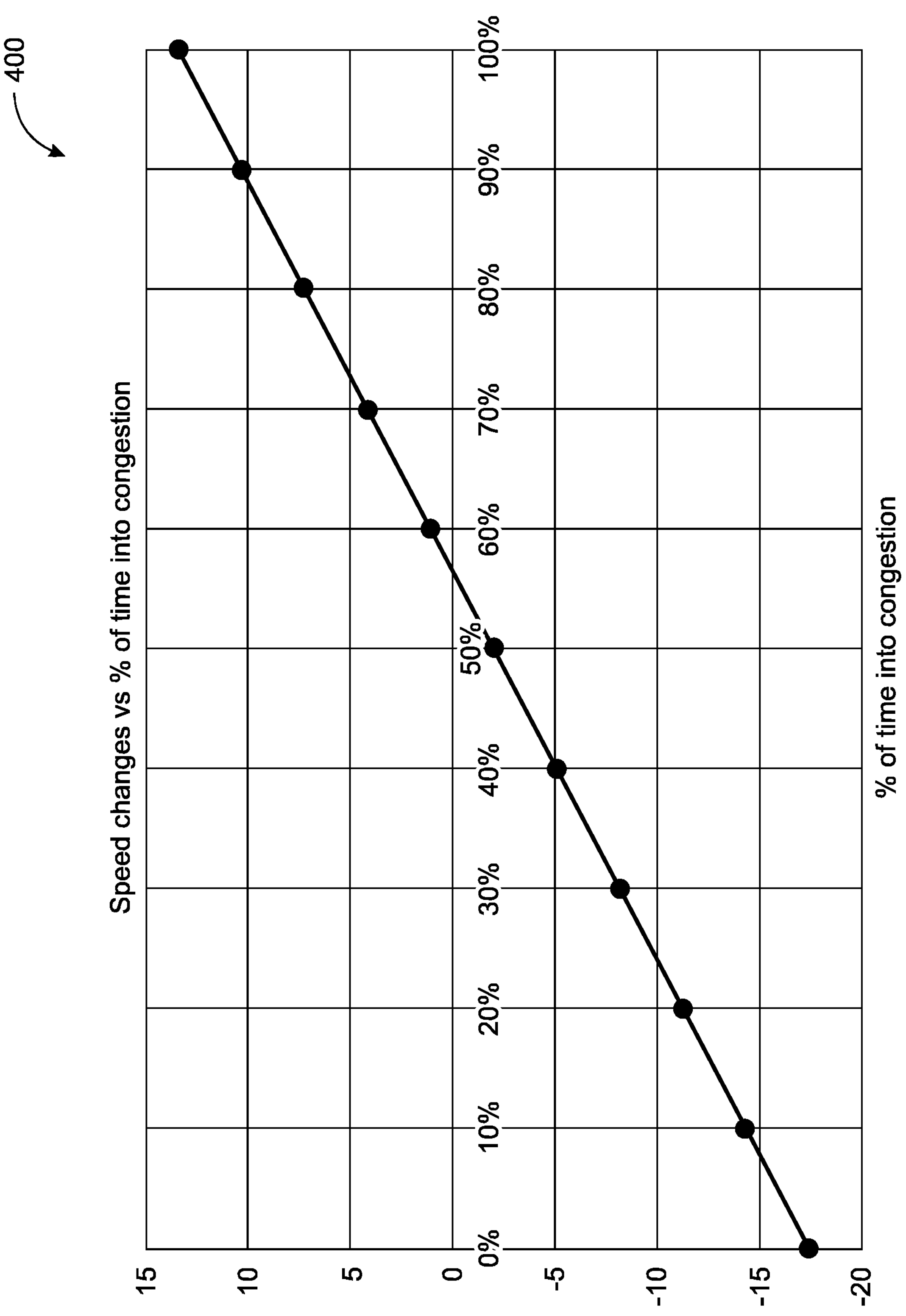
Figure 5:
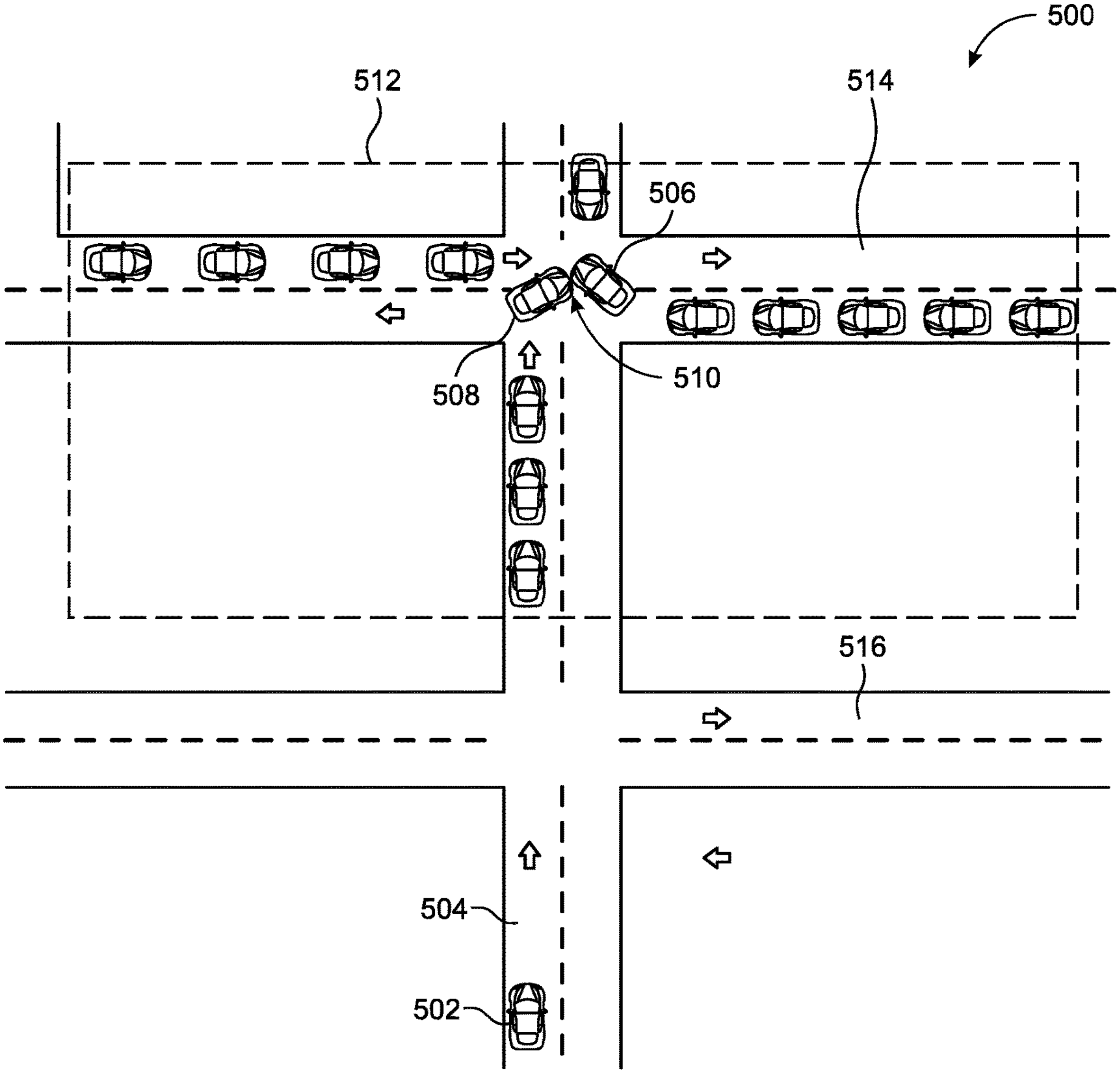
Figure 6:
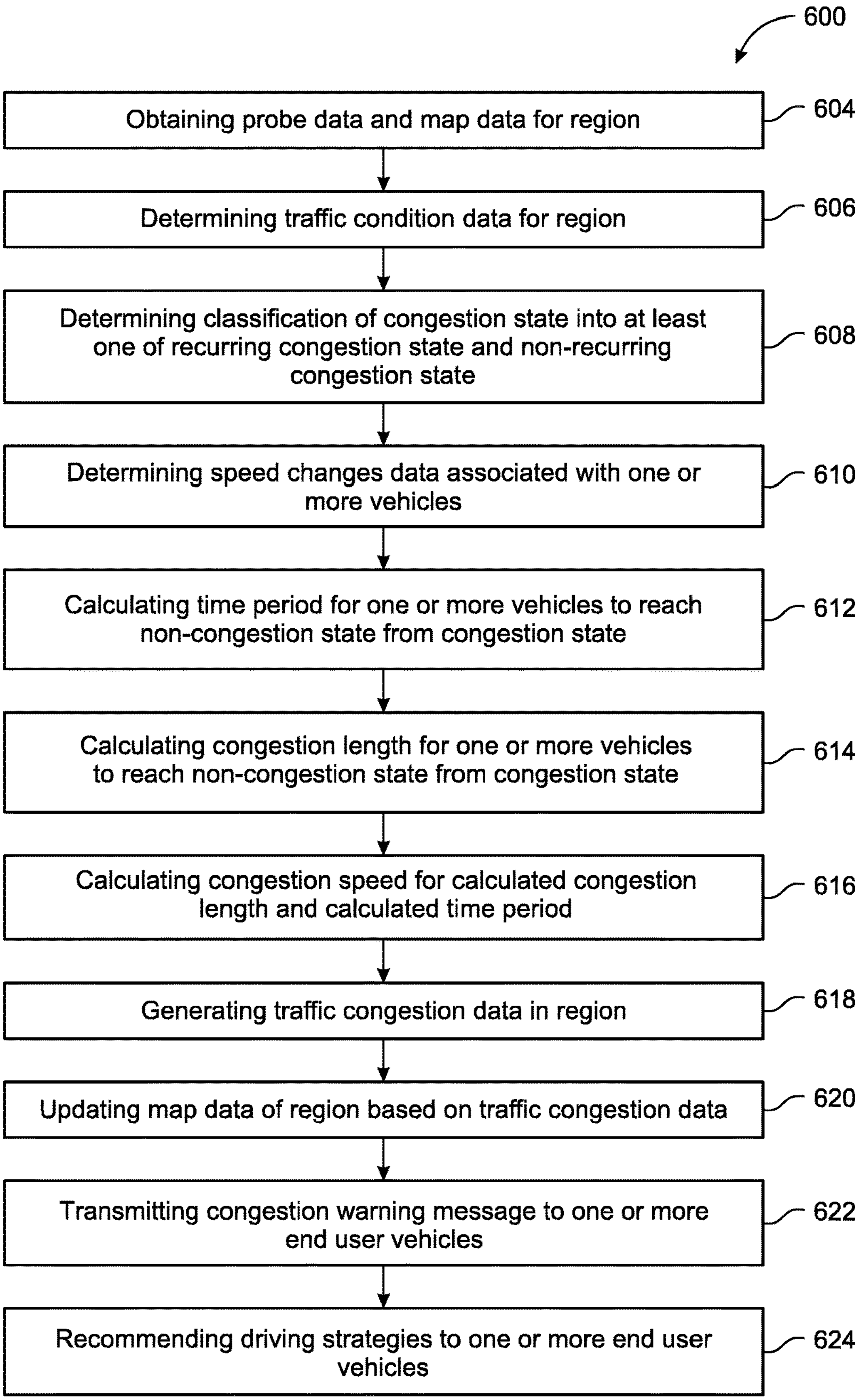

Having thus described example embodiments of the disclosure in general terms, reference will now be made to the accompanying drawings, which are not necessarily drawn to scale, and wherein:

FIG. 1 is a block diagram that illustrates a network environment of a system implemented for generating traffic congestion data associated with a road in a region, in accordance with an example embodiment;

FIG. 2 illustrates a block diagram of the system, exemplarily illustrated in FIG. 1, that may be used for determining traffic congestion data associated with a road in a region, in accordance with an example embodiment;

FIG. 3 illustrates a Time-Space Diagram (TSD) for vehicle trajectories used by a system to generate traffic congestion data, in accordance with an example embodiment;

FIG. 4 exemplarily illustrates a graphical representation of a trend for speed changes vs the percentages of congestion duration, in accordance with an example embodiment;

FIG. 5 is a schematic diagram that exemplarily illustrates a scenario for using traffic congestion data by a vehicle on a road, in accordance with an example embodiment; and FIG. 6 illustrates a flowchart 600 for implementation of an exemplary method to generate traffic congestion data for a road in a region, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may refer to a way leading a traveler from one location to another. The road may have a single lane or multiple lanes.

The term "lane" may refer to a part of a road that is designated for travel of vehicles or pedestrians as per some condition.

The term "link" may refer to any connecting pathway including, but not limited, to a roadway, a highway, a freeway, an expressway, a lane, a street path, a road, an alley, a controlled access roadway, a free access roadway and the like.

The term "route" may refer to a path from a source location to a destination location on any link.

The term 'autonomous vehicle' may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

End of Definitions

A system, a method, and a computer program product are provided herein in accordance with an example embodiment for generating traffic congestion data for a road in a region. The system, the method, and the computer program product disclosed herein provide accurate and precise traffic congestion data for providing high quality navigation assistance, especially in autonomous driving in near real time. The system, the method, and the computer program product disclosed herein facilitate safety issues and alert drivers to traffic conditions or driving conditions in a timely and targeted way in advance.

The system, the method, and the computer program product disclosed herein may be configured to determine prediction of how long a traffic congestion state may last both spatially and temporally based on probe data and map data. The system, the method, and the computer program product disclosed herein may be configured to determine prediction of speed changes within a congested area on the road.

The system, the method, and the computer program product disclosed herein may be configured to update the map data based on the traffic congestion data. The system, the method, and the computer program product disclosed herein may further provide a notification message associated with the congestion state on the road. For example, the notification message may inform a vehicle or user equipment with up-to-date map data for the region. Alternatively, the available up-to-date data may be pushed as an update to the vehicle or the user equipment. These and other technical improvements of the present disclosure will become evident from the description provided herein.

FIG. 1 is a block diagram that illustrates a network environment of a system implemented for generating traffic congestion data associated with a road in a region, in accordance with an example embodiment.

There is shown a network environment 100 that may include a system 102, a probe database 104, a mapping platform 106A, a map database 106B, user equipment (UE) 108 and a network 110. There is further shown one or more vehicles, such as a vehicle 112 on a road in a region. The UE 108 may include an application 108A and a user interface 108B (not shown in the FIG.). The system 102 may be communicatively coupled to the UE 108, via the network 110. As per specific requirements, the system 102 may also be communicatively coupled to other components not shown on FIG. 1 via the network 110.

In some example embodiments, the system 102 may be implemented in a cloud computing environment. In some other example embodiments, the system 102 may be implemented in the vehicle 112. In accordance with an embodiment, the probe database 104 may communicate directly with the map database 106B. In accordance with an embodiment, the system 102 may communicate directly with the probe database 104 and the map database 106B. In accordance with another embodiment, the probe database 104 and the map database 106B may be a part of the mapping platform 106A. All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed.

The system 102 may comprise suitable logic, circuitry, and interfaces that may be configured to generate traffic congestion data for the road in the region. The system 102 may be configured to obtain probe data and map data for the region. The system 102 may be further configured to determine traffic condition data for the region, based on the probe data and the map data. The traffic condition data may include congestion state indication data or non-congestion state indication data. The system 102 may be further configured to determine speed changes data associated with one or more vehicles based on the traffic condition data. The system 102 may be further configured to generate the traffic congestion data based on the speed changes data associated with the one or more vehicles in the region. Additionally or alternatively, the system 102 may be configured to receive geo-coordinates of the region from map data stored in the map database 108B.

The probe database 104 may comprise suitable logic, circuitry, and interfaces that may be configured to store the probe data, which may be collected, for example, from one or more vehicles traveling along a road network or within a venue. The probe data may be gathered and fused to infer an accurate map of an environment in which probes or fleeting cars are moving. In accordance with an embodiment, such probe data may be updated in real time or near real time such as on an hourly basis, to provide accurate and up to date probe data. The probe data may be collected from any sensor that may inform the probe database 104 of features within an environment that are appropriate for traffic related services. In accordance with an embodiment, the probe data may be collected from any sensor that may inform a map database 106B of features within an environment that are appropriate for mapping. For example, motion sensors, inertia sensors, image capture sensors, proximity sensors, LIDAR (light detection and ranging) sensors, and ultrasonic sensors may be used to collect the probe data. The gathering of large quantities of crowd-sourced data may facilitate the accurate modeling and mapping of an environment, whether it is a road link or an interior of a multi-level parking structure.

In accordance with an embodiment, the probe data (such as, floating car data) may be collected from consumer vehicles travelling on the road throughout a geographic region (or a region). In accordance with an embodiment, a map developer may employ field personnel to travel by a vehicle along roads throughout the region to observe features and/or record information. The map developers may crowdsource geographic map data (or the map data) and vehicle probe data (or the probe data) to generate, substantiate, or update the map data.

The probe data may be used to determine traffic volume associated with movement of one or more vehicles along the road in the region. The traffic volume on the road may correspond to the one or more vehicles on the road for a given time period. The probe count from the probe data may be observed within the given time period and projected to determine the traffic volume for that given time period. In accordance with an embodiment, the probe database 104 may be configured to store and transmit probe data including positional, speed, and temporal data. In accordance with an embodiment, the probe data may include, but not limited to, real time speed (or individual probe speed), incident data on the road, road closure and construction data, traffic signal timing data and historical recurring traffic congestion pattern data.

The probe data taken over a long period of time (e.g. months) may be diverse enough to smooth out any outlier events that would adversely affect probe distribution of the probe data. Events, however, may also be excluded or included as a weight when generating the probe distribution from the probe data. The events may also be taken into consideration when the system 102 generated the traffic congestion data for the road in the region. For example, a sports event may cause increased traffic volume over the expected normal traffic volume, hence resulting in a congestion state of traffic condition. The increased traffic volume may be determined based on previously observed and recorded events. In accordance with an embodiment, the determined traffic volume may also be calibrated based on a recent (during the event) snapshot of probe vehicles on a roadway network.

In accordance with an embodiment, the incident data of the probe data from the probe database 104 may also be supplemented with additional ground truth data acquired from roadside sensors. Advanced planning and coordination for increased traffic volume that results in the congestion state of the traffic condition may allow agencies to develop and deploy optimal operational strategies, traffic control plans, protocols, procedures, and technologies needed to control traffic and share real time or near real time information with other stakeholders on the day of an incident. Such capabilities may allow agencies to proactively manage and control traffic to accommodate the increased travel demand generated by the incident. In accordance with an embodiment, the probe database 104 may be configured to store event data about changes in traffic situation registered by GPS provider(s), such as, but not limited to, incidents, road repairs, heavy rains, snow, fog, holiday or other events which may have influence on the traffic condition of the road in the region.

The mapping platform 106A may comprise suitable logic, circuitry, and interfaces that may be configured to store one or more map attributes associated with the road in the region. The mapping platform 106A may be configured to update the map data, in the map database 106B, associated with the traffic congestion data generated by the system 102. The mapping platform 106A may include techniques related to, but not limited to, geocoding, routing (multimodal, intermodal, and unimodal), clustering algorithms, machine learning in location based solutions, natural language processing algorithms, and artificial intelligence algorithms. Data for different modules of the mapping platform 106A may be collected using a plurality of technologies including, but not limited to drones, sensors, connected cars, cameras, probes, and chipsets. In some embodiments, the mapping platform 106A may be embodied as a chip or chip set. In other words, the mapping platform 106A may comprise one or more physical packages (such as, chips) that includes materials, components and/or wires on a structural assembly (such as, a baseboard).

The map database 106B may comprise suitable logic, circuitry, and interfaces that may be configured to store the traffic congestion data of the road in the region. The data may also include cartographic data, routing data, and maneuvering data. The data may also include, but not limited to, locations of intersections, diversions to be caused due to the heavy congestion, suggested routes to avoid heavy congestion to be caused due to the congestion. In accordance with an embodiment, the map database 106B may be configured to receive the traffic congestion data related to the traffic conditions in the region for a road network from external systems, such as, one or more of background batch data services, streaming data services and third party service providers, via the network 110.

In some embodiments, the map database 106B may be a part of the mapping platform 106A. The map database 106B may be a master map database stored in a format that facilitates updating, maintenance, and development. For example, the master map database or data in the master map database may be in an Oracle spatial format or other spatial format, such as, for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

In addition, the map database 106B may include the probe data for the events (such as, but not limited to, traffic incidents, construction activities, scheduled events, and unscheduled events) associated with Point of Interest (POI) data records or other records of the map database 106B associated with the system 102.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as the UE 108. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database 106B in a delivery format to produce one or more compiled navigation databases.

In some embodiments, the map database 106B may be a master geographic database configured on the side of the system 102. In accordance with an embodiment, a client-side map database may represent a compiled navigation database that may be used in or with end user devices (e.g., the UE 108) to provide navigation based on the traffic congestion data, the traffic conditions, speed adjustment, and/or map-related functions to navigate through the road in the region.

Optionally, the map database 106B may contain lane segment and node data records or other data that may represent the road segment in the region, pedestrian lane or areas in addition to or instead of the vehicle road record data. The road segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, and parks. The map database 106B may additionally include data about places, such as cities, towns, or other communities, and other geographic features such as, but not limited to, bodies of water, and mountain ranges.

The UE 108 may comprise suitable logic, circuitry, and interfaces that may be configured to provide navigation assistance to vehicles, such as, the vehicle 112 among other services. In accordance with an embodiment, the UE 108 may be configured to provide navigation and map functions (such as, guidance and map display) along with the traffic conditions of a route for an end user (not shown in the FIG. 1). The traffic conditions may indicate a degree of congestion on the road. In accordance with an embodiment, the degree of congestion may correspond to one of a heavy congestion, a mild congestion and a light congestion or free flow on the road. In accordance with an embodiment, the UE 108 may be configured to transmit congestion risk warning message to the vehicle 112, based on the traffic congestion data. The traffic congestion data may be updated in the map data of the map database 106B. In accordance with an embodiment, the UE 108 may be configured to notify the vehicle 112 with driving strategies to drive on a desired location. In accordance with an embodiment, the vehicle 112 associated with the UE 108 may correspond to an autonomous vehicle or a manually driven vehicle. For example, the autonomous vehicle may exhibit autonomous driving on streets and roads having physical dividers between driving lanes, a road segment having one or more incoming and outgoing lanes. The UE 108 may be a part of the vehicle 112. The UE 108 may be installed in the vehicle 118. In accordance with an embodiment, the UE 108 may be the vehicle itself.

The UE 108 may include the application 108A with the user interface 108B. In accordance with an embodiment, the UE 108 may be an in-vehicle navigation system, such as, an infotainment system, a personal navigation device (PND), a portable navigation device, a cellular telephone, a smart phone, a personal digital assistant (PDA), a watch, a camera, a computer, a workstation, and other device that may perform navigation-related functions (such as digital routing and map display). Examples of the UE 108 may include, but is not limited to, a mobile computing device (such as a laptop computer, tablet computer, mobile phone and smart phone), navigation unit, personal data assistant, watch, and camera. Additionally or alternatively, the UE 108 may be a fixed computing device, such as a personal computer, computer workstation, kiosk, office terminal computer or a system.

In accordance with an embodiment, the UE 108 may be an in-vehicle navigation system for navigation and map functions (such as, guidance and map display). The UE 108 may include the application 108A with the user interface 108B to access one or more map and navigation related functions that may include traffic condition notification rendered by the system 102. In other words, the UE 108 may include the application 108A with the user interface 108B. The user interface 108B may be configured to enable the end user associated with the UE 108 to access the system 102. In accordance with an embodiment, the UE 108 may be accessible to the system 102 via the network 110. Although a single UE 108 is shown in the example environment 100 of FIG. 1, it may however be contemplated that more than one user equipment may also be possible within the scope of this disclosure and therefore, the system 102 may be communicatively coupled to as many user equipment as may be required for a specific implementation. In some example embodiments, the UE 108 may serve the dual purpose of a data gatherer and a beneficiary device.

In some example embodiments, the UE 108 may comprise acoustic sensors such as a microphone array, position sensors such as a GPS sensor, orientation sensors such as gyroscope, motion sensors such as accelerometer, a display enabled user interface such as a touch screen display, and other components as may be required for specific functionalities of the UE 108. In some embodiments, the system 102 may be implemented in the UE 108. Therefore, a local copy of the map data is stored in cache memory of the UE 108.

The network 110 may comprise suitable logic, circuitry, and interfaces that may be configured to provide a plurality of network ports and a plurality of communication channels for transmission and reception of data, such as data from the probe database 104, the event database 106 and the map database 106B. Each network port may correspond to a virtual address (or a physical machine address) for transmission and reception of communication data. For example, the virtual address may be an Internet Protocol Version 4 (IPv4) (or an IPv6 address) and the physical address may be a Media Access Control (MAC) address. The network 110 may include a medium through which the system 102, and/or the other components may communicate with each other. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In operation, the system 102 may be configured to obtain a set of input data comprising at least the probe data associated with the road in the region. In accordance with an embodiment, the region may be determined by the system 102 in response to a request from the end user. In accordance with another embodiment, the determination of the region may also be initiated autonomously by the system 102. The region may be of any size or shape, such as, a rectangle, a circle, a trapezoidal, a square, a triangle, and a parallelogram. In accordance with an embodiment, the probe data may be classified as current probe data and historical probe data.

The one or more vehicles may include, but not limited to, a bus, a taxi, and a vehicle. In accordance with an embodiment, any machine learning technique (such as, deep machine learning technique) may be used to identify the one or more vehicles on the road in the region.

The system 102 may be configured to determine the traffic condition data for the region, based on the probe data and the map data. The system 102 may be configured to determine the traffic condition data by comparing current speeds and/or delays of the one or more vehicles on the road with a predefined set of thresholds on various roadway facilities. In accordance with an embodiment, the traffic condition data may also be based on a count of the one or more vehicles on the road and road capacity data.

In accordance with an embodiment, the traffic condition data may include the congestion state indication data or the non-congestion state indication data. The congestion state indication data indicates a congestion state of the one or more vehicles on the road. The non-congestion state indication data indicates a non-congestion state (or free flow state) of the one or more vehicles on the road. The congestion state may hamper drivers or autonomous vehicles, for example by prolonging travel time, by increasing the likelihood of collisions, or by forcing drivers onto unfamiliar or undesirable travel routes.

In accordance with an embodiment, the system 102 may be further configured to determine a classification of the congestion state into at least one of a recurring congestion state and a non-recurring congestion state. The system 102 may be further configured to determine the classification of the congestion state into the recurring congestion state by comparing real-time speed with historical speeds and free-flow speeds from a dataset of the probe data obtained from the probe database 104. Therefore, when the historical speeds resulted in the congestion state, then the congestion state in real time may be classified as the recurring congestion state. Further, when the historical speeds did not result in the congestion state, then the congestion state in real time may be classified as the non-recurring congestion state. In accordance with an embodiment, the recurring congestion state may be mostly influenced by historical averages, with adjusted daily variance of various parameters of the probe data. In accordance with an embodiment, the non-recurring congestion state may be affected by incident types, incident severity, and prevailing traffic condition on the road.

In accordance with an embodiment, the system 102 may be further configured to determine speed changes data associated with the one or more vehicles based on the traffic condition data. The speed changes data may indicate at least a dataset of speed changes for the one or more vehicles on a congested area on the road. In accordance with an embodiment, the system 102 may be further configured to calculate a time period for the one or more vehicles to reach the non-congestion state from the congestion state. The calculated time period may correspond to temporal congestion prediction by the system 102. In accordance with an embodiment, the system 102 may be further configured to calculate a congestion length for the one or more vehicles to reach the non-congestion state from the congestion state. The congestion length may correspond to spatial congestion prediction by the system 102. In accordance with an embodiment, the system 102 may be further configured to calculate a congestion speed for the calculated congestion length and the calculated time period. In accordance with an embodiment, the system 102 may be further configured to generate the traffic congestion data based on the speed changes data, the time period, the congestion length and the congestion speed associated with the one or more vehicles in the region.

In accordance with an embodiment, the system 102 may be configured to transmit a report of the traffic congestion data to a backend server (not shown in the FIG. 1). Further, in accordance with an embodiment, the system 102 may be configured to update the map data in the map database 106B, based on the traffic congestion data. Therefore, the system 102 may be configured to transmit a congestion warning message to one or more end user vehicles, based on the updated map data. Further, the system 102 may be configured to recommend driving strategies to the one or more end user vehicles, based on the updated map data. Such transmission of the congestion warning messages and the driving strategies to drivers or autonomous vehicles in a timely manner, may allow drivers or autonomous vehicles to adjust their travel plans to increase safety and convenience.

Further, a user of a vehicle (such as the vehicle 112) or the vehicle 112 itself can make an appropriate decision to drive safely, avoid traffic congestion on the road and identify the best route, based on the traffic congestion data determined by the system 102. In an embodiment, the vehicle 112 may change its maneuver, based on the traffic congestion data to drive safely and thereby creating a safer city.

FIG. 2 illustrates a block diagram 200 of the system, exemplarily illustrated in FIG. 1 that may be used for generating traffic congestion data for a road in a region, in accordance with an example embodiment. FIG. 2 is explained in conjunction with FIG. 1.

In the embodiments described herein, the system 102 may include a processing means, such as, at least one processor (hereinafter interchangeably used with processor) 202, a storage means, such as, at least one memory (hereinafter interchangeably used with memory) 204, a communication means, such as, at least one network interface (hereinafter interchangeably used with network interface) 206 and an I/O interface 208. The processor 202 may retrieve computer executable instructions that may be stored in the memory 204 for execution of the computer executable instructions. The memory 204 may store the probe data associated with the road in the region for which the traffic congestion data may be generated. In accordance with an embodiment, the processor 202 may be configured to obtain input (such as, real time probe data and historical probe data of the probe data, the map attributes associated with the road in the region) from background batch data services, streaming data services or third party service providers, and renders output, such as, the traffic congestion data, notification associated with spatial and temporal metric of the traffic congestion data for use by the end user on the UE 108 through the network interface 206.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading. Additionally or alternatively, the processor 202 may include one or more processors capable of processing large volumes of workloads and operations to provide support for big data analysis. In an example embodiment, the processor 202 may be in communication with the memory 204 via a bus for passing information among components of the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor 202 may be specifically configured hardware for conducting the operations described herein.

Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202. The network environment, such as, 100 may be accessed using the network interface 206 of the system 102. The network interface 206 may provide an interface for accessing various features and data stored in the system 102.

The processor 202 of the system 102 may be configured to generate traffic condition data, based on probe data and map data. The traffic condition data may include congestion state data or non-congestion state data. The processor 202 may be further configured to determine speed changes data associated with one or more vehicles. The processor 202 may be further configured to determine temporal data and spatial data associated with the one or more vehicles to reach a congestion state to a non-congestion state. The processor 202 may be further configured to generate the traffic congestion data based on the determined speed changes data, the temporal data and the spatial data.

The memory 204 of the system 102 may be configured to store a dataset (such as, but not limited to, the probe data and the map data) associated with the road in the region. In accordance with an embodiment, the memory 204 may include processing instructions for generating the traffic congestion data with a dataset associated with the road. The dataset may include real-time data and historical data, from service providers. The memory 204 of the system 102 may be configured to store the traffic congestion data.

In some example embodiments, the I/O interface 208 may communicate with the system 102 and displays input and/or output of the system 102. As such, the I/O interface 208 may include a display and, in some embodiments, may also include a keyboard, a mouse, a joystick, a touch screen, touch areas, soft keys, one or more microphones, a plurality of speakers, or other input/output mechanisms. In one embodiment, the system 102 may comprise user interface circuitry configured to control at least some functions of one or more I/O interface elements such as a display and, in some embodiments, a plurality of speakers, a ringer, one or more microphones and/or the like. The processor 202 and/or I/O interface 208 circuitry comprising the processor 202 may be configured to control one or more functions of one or more I/O interface 208 elements through computer program instructions (for example, software and/or firmware) stored on a memory 204 accessible to the processor 202. The processor 202 may further render notification associated with the traffic congestion data on the user equipment 108 via the I/O interface 208.

In some embodiments, the processor 202 may be configured to provide Internet-of-Things (IOT) related capabilities to users of the system 102 disclosed herein. The IoT related capabilities may in turn be used to provide smart city solutions by providing real time parking updates, big data analysis, and sensor-based data collection by using the cloud based mapping system for providing navigation and parking recommendation services. In some embodiments, the system 102 may be configured to provide an environment for development of parking strategy recommendation solutions for navigation systems in accordance with the embodiments disclosed herein. The environment may be accessed using the network interface 206. The network interface 206 may provide an interface for accessing various features and data stored in the system 102.

FIG. 3 illustrates an exemplary Time-Space Diagram (TSD) 300 plotted for vehicle trajectories used by a system to generate traffic congestion data, in accordance with an example embodiment. FIG. 3 is explained in conjunction with FIG. 1 and FIG. 2.

With reference to FIG. 3, there is shown the TSD that is plotted for the vehicle trajectories for a dataset, obtained from probe data and map data. There is shown an example plot of 6 vehicles traveling along a distance (represented on vertical axis) and by time (represented by horizontal axis). Each line (labelled as 1 to 6) may represent one vehicle trajectory corresponding to a respective vehicle.

The TSD corresponds to a graph that describes a relationship between location of vehicles in a traffic stream on a road and the time as the vehicles progress along the road. The trajectories of individual vehicles in motion are portrayed in the TSD by sloping lines. The slope (corresponding to line 1) may represent instantaneous speed of a first vehicle from the 6 vehicles. Similarly, the slope (corresponding to line 2 to 6) may represent instantaneous speed of respective vehicles from the 6 vehicles. Reductions in speed cause the slopes of the lines to flatten, while increase in speed causes the slopes to become greater. Acceleration causes the time-space slope for the accelerating vehicle to bend until the new speed is attained. Deflected portions of the trajectories (slopes) may represent vehicles undergoing speed changes such as deceleration. The trajectories of the first vehicle and the sixth vehicle are not deflected. Therefore, the first vehicle and the sixth vehicle may not have undergone any speed changes. Therefore the congestion state may have started after the first vehicle passed the road and the free flow speed was resumed by vehicle 6 when the non-congestion state resumed after the congestion state.

The congestion state starts at Distance A at Time C, and after the first vehicle passes, the subsequent vehicles would have to slow down within the region 302 until Time D when the sixth vehicle becomes the first one that would travel at its normal speed across the region 302. The boundaries between congestion and free flow speeds are called shockwaves. The shockwaves may be represented by dotted lines (labelled lines 1 to 6). Congestion speed v may represent the vehicle speed within the shockwave boundaries (region 302). Theoretically, there are 6 types of traffic shockwaves, viz., forward forming shockwaves, backward forming shockwaves, frontal stationary shockwaves, rear stationary shockwaves, backward recovery shockwaves and forward recovery shockwaves. Each shockwave may represent a unique transition state between congestion (or a congestion state) and free flow traffic state. Area bounded by the shockwaves may be considered as congestion area in the TSD. Therefore, the TSD shows the position of individual vehicles in time and in space that may be very useful for understanding traffic flow and also in generation of the traffic congestion data.

In accordance with an embodiment, the dataset may not be limited to 6 vehicles, and the probe data may be taken from multiple resources on a large scale (hundreds and thousands of vehicles) as an input to the system 102. The probe data may include a real time probe data that includes sensor data received from mobile devices or probe vehicles, and map artifact data which describes the road segment topology and geometry. The map data may be obtained from map service providers by the system 102. Upon receiving real time probe data, the system 102 may ingest the probe data for the six vehicles and the map data, and generate the traffic congestion data.

The TSD may be used to utilize spatio-temporal graphical representation of congestion related data and to determine traffic congestion patterns. Therefore, the system 102 may determine how long a congestion state would last both spatially and temporally and also determine the speed changes within the congested area.

FIG. 4 exemplarily illustrates a graphical representation 400 of a trend for speed changes versus percentages of congestion duration, in accordance with an example embodiment. FIG. 4 is explained in conjunction with FIG. 1 to FIG. 3.

With reference to FIG. 4, there is shown an exemplary plot of speed changes of vehicles (represented on vertical axis) and by percentage of time into congestion state (represented by horizontal axis). Data from various locations shows a similar trend as shown in the FIG. 4 where 60% seems to be the time when speed changes are at zero. In other words, when it is about 60% of time into a time period of congestion, the congestion state may start to be discharging, and the speed recovery of the vehicles may start. Such inference from the trend shown in the graphical representation 400 may be used by the system 102 to train models on traffic patterns for different datasets. Such trend in the graphical representation 400 may be used to detect a congestion state for different time intervals and may provide insightful data or information associated with the spatial and temporal patterns of the congestion state.

FIG. 5 is a schematic diagram 500 that exemplarily illustrates a scenario for using traffic congestion data by a vehicle on a road, in accordance with an example embodiment. FIG. 5 is explained in conjunction with FIG. 1 to FIG. 4.

With reference to FIG. 5, there is shown a vehicle 502 travelling on a road 504, collided vehicles 506 and 508 on an intersection road 510. A congested area is represented by a dotted boundary 512.

The road 504 and a road 514 may be a part of a way leading the vehicle 502 from a source location to a destination location. In one example, the road 504 may be a one-way or a two-way road. In the example embodiment illustrated in FIG. 5, the road 504 is a two-way road. Additionally, in accordance with an embodiment, the road 504 may comprise a single lane or multiple lanes, that is, the road may be a single lane road, a two lane road or a four lane road.

The vehicle 502 may request for a route between two locations and the road 514 may also be a part of the requested route. The system 102 may be invoked upon receipt of the request for the route to identify congested area 512 that leads vehicle 502 towards the road 514. In accordance with an embodiment, the route generated by the system 102, in response to the request made, may comprise a sequence of links. Alternately, the congested area 512 may already be indicated in the route for the vehicle 502 and the system 102 may be invoked to generate map data of the congested area 512. Irrespective of the manner in which the system 102 is triggered, the system 102 may provide measures based on generation of the traffic congestion data by the system 102 for the roads (such as, the road 514) included in the route.

On being triggered, the system 102 may obtain the map data of the region encompassed by the route from a data source, such as, the map database 106B. The map data may comprise, for example, the map data of the links that the route may encompass in the region. The map data of a link may comprise one or more of a link start node, a link end node, upstream heading, downstream heading, uplink data, shape location points, road classifier data, lane count or map speed limit associated with the particular link.

The system 102 may be configured to obtain probe data of the region encompassed by the route from a data source, such as, the probe database 104. The probe data may include historical probe data from the probe database 104 for the region encompassed by the route. The historical probe data may indicate a history of traffic pattern associated with congestion information for the region in the memory 202.

In accordance with an embodiment, the historical probe data may include, but not limited to, travel time, delay time, individual probe speed (such as, current speed), aggregated link speed, traffic signal timing information, incident type, and congestion data for various times of the day, days of the week, days of the year, and so on. In accordance with an embodiment, data such as, but not limited to, the historical probe data, such as for weather may be updated at a less frequent rate. For example, the historical probe data may be updated as part of a routine update, such as a monthly update. The historical probe data may be used by the system 102 to predict clearance time for the congestion state of the traffic condition, to predict traffic conditions when the real time probe data, and/or incident data may be unavailable for a particular roadway, to predict a probability of accidents; or for any other suitable purpose. For example, accidents may be more likely when speeds are variable at certain times of the day. These types of statistics may be determined by analyzing the historical probe data by the system 102. The system 102 may support computation for a huge amount of the historical probe data to determine recurring traffic patterns and to classify the traffic condition on the road.

The system 102 may be further configured to obtain real time or near real time probe data of the region encompassed by the route from the probe database 104. The probe data may also include the real time probe data. The term "real-time" as used throughout the disclosure may denote that collected data may be delivered to the system 102 in a timely manner with delays as need to transfer the data from a data collection point to the system 102. The system 102 may support real time probe data from a huge number of vehicles for timely updates and also determine non-recurring spontaneous traffic events.

The system 102 may be further configured to determine traffic condition data for the region, based on the probe data and the map data. The traffic condition data may include congestion state indication data or non-congestion state indication data. The congestion state indication data may indicate information about the congestion state on the road. The non-congestion state indication data may indicate information about the non-congestion state on the road, when the vehicles are moving in a free flow speed.

The system 102 may be further configured to determine the congestion state based on comparison of current speeds and/or delay time of the one or more vehicles on the road with a predefined set of threshold values for that road or a road network. The current speed and the delay time are analyzed from the real time probe data. The congestion state may be a state in which the current speed determined from the probe data is less than a threshold speed associated with the same data capture location and time.

The system 102 may be further configured to determine a classification of the congestion state into at least one of a recurring congestion state and a non-recurring congestion state. The recurring congestion state may happen in a particular road section during a particular time of the day where the demand of road space exceeds supply. The non-recurring congestion state may happen because of special or random event on the road, such as road construction or accidents where the demand of road space exceeds supply temporarily.

The system 102 may be further configured to determine the classification of the congestion state into the recurring congestion state by comparing real-time speed with historical speeds and free-flow speeds from a dataset of the probe data obtained from the probe database 104. Therefore, when the historical speeds resulted in the congestion state, then the congestion state in real time may be classified as the recurring congestion state. Further, when the historical speeds did not result in the congestion state, then the congestion state in real time may be classified as the non-recurring congestion state. In accordance with an embodiment, the recurring congestion state may be mostly influenced by historical averages, with adjusted daily variance of various parameters of the probe data. In accordance with an embodiment, the non-recurring congestion state may be affected by incident types, incident severity, and prevailing traffic condition on the road.

For effective and accurate prediction about the congestion state, the system 102 may be further configured to determine the classification of the congestion state into the recurring congestion. The classification of the congestion state into the recurring congestion may be based on at least historical traffic pattern data of the probe data.

The system 102 may be further configured to determine the classification of the congestion state into the non-recurring congestion, based on at least incident data of the probe data. Parameters, such as, but not limited to, initial congestion speed, incident type, and incident severity from the probe data may be used by the system 102 to calculate time period and speed changes within the time period of congestion state.

The system 102 may be further configured to determine speed changes data associated with one or more vehicles based on the traffic condition data. The speed changes may be determined inside the congested area 512 at a particular time interval. In accordance with an embodiment, the speed changes may correspond to vehicular velocity changes. The speed changes within congestion area are highly related to the percent of time into the total congestion duration as explained in FIG. 4.

The system 102 may be further configured to calculate a congestion length for the one or more vehicles to reach the non-congestion state from the congestion state, based on the congestion state indication data. The congested area 512 may be a dynamic area which is impacted spatially and temporally. The congested area 512 may include the congestion length of congested section of a road network.

The system 102 may be further configured to calculate the time period for the one or more vehicles to reach a non-congestion state from a congestion state, based on the congestion state indication data and the non-congestion state indication data. The time period may indicate temporal congestion prediction that may be measured in terms of duration or delay, according to examples. For example, incident duration or time period may be measured from the time of the traffic incident to the time at which the free flow speed of the affected road returns to recurrent conditions. Further, the delay time may be calculated as a cumulative delay of all drivers or autonomous vehicles affected by the incident.

The system 102 may be further configured to calculate a congestion speed for the calculated congestion length and the calculated time period. Rush hours during the day may have lower congestion speed on the road as compared to other parts of the day.

The system 102 may be further configured to generate the traffic congestion data for the route associated with the vehicle 502, based on the determine speed changes data, calculated time period, calculated congestion speed and the calculated congestion length. The traffic congestion data may help the driver of the vehicle 502 or the vehicle 502 itself to effectively avoid impacted area 512 which lead to the road 514, part of the route towards destination location and instead re-route the vehicle 502 to road 516 that may also lead to the destination location in real-time.

FIG. 6 illustrates a flowchart 600 for implementation of an exemplary method to generate the traffic congestion data for a road in a region, in accordance with an example embodiment. The control starts at 602.

At 604, probe data and map data for a region may be obtained. The processor 202 may be configured to obtain the probe data and the map data for the region. The probe data may include, but not limited to, individual probe speed, aggregated link speed, incident data, and traffic signal timing information. The map data may include, but not limited to, road closure and construction information and map attributes associated with a road in the region.

At 606, traffic condition data for the region may be determined. The processor 202 may be configured to determine the traffic condition data for the region, based on the probe data and the map data. In accordance with an embodiment, the traffic condition data may include congestion state indication data or non-congestion state indication data.

At 608, a classification of the congestion state may be determined. The processor 202 may be configured to determine the classification of the congestion state into at least one of a recurring congestion state and a non-recurring congestion state. The recurring congestion state and a non-recurring congestion state is explained in FIG. 5.

At 610, speed changes data associated with the one or more vehicles may be determined. The processor 202 may be configured to determine the speed changes data associated with one or more vehicles based on the traffic condition data.

At 612, time period for the one or more vehicles to reach a non-congestion state from a congestion state may be calculated. The processor 202 may be configured to calculate the time period for the one or more vehicles to reach a non-congestion state from a congestion state.

At 614, congestion length for the one or more vehicles to reach the non-congestion state from the congestion state may be calculated. The processor 202 may be configured to calculate the congestion length for the one or more vehicles to reach the non-congestion state from the congestion state.

At 616, congestion speed may be calculated. The processor 202 may be configured to calculate the congestion speed for the calculated congestion length and the calculated time period.

At 618, traffic congestion data may be generated. The processor 202 may be configured to generate the traffic congestion data based on the speed changes data, calculated time period, calculated congestion length and the congestion speed.

At 620, the map data of the region may be updated. The processor 202 may be configured to update the map data of the region based on the traffic congestion data.

At 622, a congestion warning message may be transmitted to one or more end user vehicles, based on the updated map data. The processor 202 may be configured to transmit a congestion warning message to one or more end user vehicles, based on the updated map data.

At 624, driving strategies may be recommended to one or more end user vehicles, based on the updated map data. The processor 202 may be configured to recommend the driving strategies to one or more end user vehicles, based on the updated map data. The control passes to the end.

Accordingly, blocks of the flowchart 600 support combinations of means for performing the specified functions and combinations of operations for performing the specified functions for performing the specified functions. It will also be understood that one or more blocks of the flowchart 600, and combinations of blocks in the flowchart 600, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 202 and/or a device or circuit for executing instructions or executing an algorithm for processing information as described above.

On implementing the method 600 disclosed herein, the end result generated by the system 102 is a tangible generation of traffic congestion data for a road in a region. The generation of traffic congestion data is of utmost importance to avoid traffic jams, mishaps from happening on roads, busy streets, highways, and freeways.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating traffic congestion data in a region, the system comprising:

at least one non-transitory memory configured to store computer executable instructions; and at least one processor configured to execute the computer executable instructions to:

obtain probe data and map data for the region, wherein the probe data includes real-time probe data collected from one or more vehicle sensors of one or more vehicles in the region over a computer network by a mapping platform;

determine traffic condition data in real time for the region, based on the probe data and the map data, wherein the traffic condition data comprises at least one of congestion state indication data or non-congestion state indication data, and wherein the traffic condition data indicates a percent of time into a total congestion duration of a congestion state;

determine speed changes data associated with the one or more vehicles in the region based on the percent of time into the total congestion duration of the congestion state;

generate the traffic congestion data based on the speed changes data associated with the one or more vehicles in the region, wherein the traffic congestion data comprises a calculated prediction of at least one of a congestion length or a time period to reach the non-congestion state from the congestion state; and update the map data of a map database in real time based on the traffic congestion data.

2. The system of claim 1, wherein the time period is calculated based on at least one of the congestion state indication data and the non-congestion state indication data.

3. The system of claim 2, wherein the congestion length is calculated based on at least one of the congestion state indication data and the non-congestion state indication data.

4. The system of claim 3, wherein the at least one processor is further configured to calculate a congestion speed for the calculated congestion length and the calculated time period.

5. The system of claim 4, wherein the at least one processor is further configured to determine a classification of the congestion state into at least one of a recurring congestion state and a non-recurring congestion state.

6. The system of claim 5, wherein the at least one processor is further configured to determine the classification of the congestion state into the recurring congestion state, based on at least historical traffic pattern data of the probe data.

7. The system of claim 5, wherein the at least one processor is further configured to determine the classification of the congestion state into the non-recurring congestion state, based on at least incident data of the probe data.

8. The system of claim 1, wherein the at least one processor is further configured to transmit a congestion warning message to one or more end user vehicles, based on the updated map data.

9. The system of claim 1, wherein the at least one processor is further configured to recommend driving strategies to one or more end user vehicles, based on the updated map data.

10. A method for generating traffic congestion data in a region, the method comprising:

obtaining, by one or more processors, probe data and map data for the region, wherein the probe data includes real-time probe data collected from one or more vehicle sensors of one or more vehicles in the region over a computer network by a mapping platform;

determining, by the one or more processors, traffic condition data in real time, based on the probe data and the map data, wherein the traffic condition data comprises at least one of congestion state indication data or non-congestion state indication data, and wherein the traffic condition data indicates a percent of time into a total congestion duration of a congestion state;

determining, by the one or more processors, speed changes data associated with the one or more vehicles in the region, based on the percent of time into the total congestion duration of the congestion state;

determining, by the one or more processors, temporal data and spatial data associated with the at least one of the congestion state indication data or the non-congestion state indication data;

generating, by the one or more processors, the traffic congestion data based on the determined speed changes data, the temporal data and the spatial data, wherein the traffic congestion data comprises a calculated prediction of at least one of a congestion length or a time period to reach the non-congestion state from the congestion state; and updating the map data of a map database in real time based on the traffic congestion data.

11. The method of claim 10, wherein the congestion length is calculated based on at least one of the congestion state indication data and the non-congestion state indication data.

12. The method of claim 11, wherein determining the spatial data comprises calculating a congestion length in the region for the one or more vehicles to reach the non-congestion state from the congestion state, based on the congestion state data and the non-congestion state data.

13. The method of claim 12, further comprising calculating a congestion speed associated with the one or more vehicles for the calculated congestion length and the calculated time period.

14. The method of claim 13, further comprising determining a classification of the congestion state into a recurring congestion state based on at least historical traffic pattern data of the probe data.

15. The method of claim 13, further comprising determining a classification of the congestion state into a non-recurring congestion state based on at least incident data of the probe data.

16. A computer programmable product comprising a non-transitory computer readable medium having stored thereon computer executable instructions, which when executed by one or more processors, cause the one or more processors to carry out operations for generating traffic congestion data in a region, the operations comprising:

obtaining, by the one or more processors, probe data and map data for the region, wherein the probe data includes real-time probe data collected from one or more vehicle sensors of one or more vehicles in the region over a computer network by a mapping platform;

determining, by the one or more processors, traffic condition data in real time, based on the probe data and the map data, wherein the traffic condition data comprises at least one of congestion state indication data or non-congestion state indication data, and wherein the traffic condition data indicates a percent of time into a total congestion duration of a congestion state;

determining, by the one or more processors, speed changes data associated with the one or more vehicles in the region, based on the percent of time into the total congestion duration of the congestion state;

determining, by the one or more processors, temporal data and spatial data associated with the at least one of the congestion state indication data or the non-congestion state indication data;

generating, by the one or more processors, the traffic congestion data based on the determined speed changes data, the temporal data and the spatial data, wherein the traffic congestion data comprises a calculated prediction of at least one of a congestion length or a time period to reach the non-congestion state from the congestion state; and updating the map data of a map database in real time based on the traffic congestion data.

17. The computer programmable product of claim 16, wherein the operations further comprise calculating a time period in the region for the one or more vehicles to reach a non-congestion state from a congestion state, for determining the temporal data, based on at least one of the congestion state indication data and the non-congestion state indication data.

18. The computer programmable product of claim 17, wherein the congestion length is calculated based on at least one of the congestion state indication data and the non-congestion state indication data.

19. The computer programmable product of claim 18, further comprising determining a classification of the congestion state into at least one of a recurring congestion state and a non-recurring congestion state.

* * * * *